US010734940B2

(12) United States Patent
Lange et al.

(10) Patent No.: US 10,734,940 B2
(45) Date of Patent: Aug. 4, 2020

(54) SOLAR TRACKER DRIVE SHAFT

(71) Applicant: NEAPCO INTELLECTUAL PROPERTY HOLDINGS, LLC, Farmington Hills, MI (US)

(72) Inventors: Shawn Lange, Lincoln, NE (US); Richard Schneck, Lincoln, NE (US)

(73) Assignee: NEAPCO INTELLECTUAL PROPERTY HOLDINGS, LLC, Farmington Hills, MI (US)

(*) Notice: Subject to any disclaimer, the term of this patent is extended or adjusted under 35 U.S.C. 154(b) by 120 days.

(21) Appl. No.: 15/897,640

(22) Filed: Feb. 15, 2018

(65) Prior Publication Data

US 2018/0175784 A1 Jun. 21, 2018

Related U.S. Application Data

(63) Continuation of application No. 15/717,652, filed on Sep. 27, 2017.

(60) Provisional application No. 62/400,303, filed on Sep. 27, 2016.

(51) Int. Cl.
*H02S 20/32* (2014.01)
*F24S 30/425* (2018.01)
*H02S 30/00* (2014.01)
*F24S 30/00* (2018.01)

(52) U.S. Cl.
CPC .......... *H02S 20/32* (2014.12); *F24S 30/425* (2018.05); *H02S 30/00* (2013.01); *F24S 2030/134* (2018.05); *F24S 2030/136* (2018.05); *F24S 2030/15* (2018.05); *Y02E 10/50* (2013.01)

(58) Field of Classification Search
CPC ........ H02S 20/30; H02S 20/32; F24S 30/425; F24S 2030/11–13; F24S 2030/15–16; F24S 2030/40; F24S 2030/42; F16C 3/03; F16D 3/06; F16D 3/18; F16D 3/52; F16D 3/185; F16D 2003/22326; F16B 7/1463
See application file for complete search history.

(56) References Cited

U.S. PATENT DOCUMENTS

| 4,504,164 | A | * | 3/1985 | Bien | B62D 1/16 403/109.3 |
|---|---|---|---|---|---|
| 5,628,688 | A | | 5/1997 | Eversole et al. | |
| 6,241,616 | B1 | * | 6/2001 | Lightcap | F16C 3/03 464/162 |
| 8,459,249 | B2 | | 6/2013 | Corio | |
| 2003/0004001 | A1 | | 1/2003 | Bell et al. | |
| 2003/0083136 | A1 | * | 5/2003 | Park | F16C 3/03 464/162 |
| 2007/0225082 | A1 | | 9/2007 | Valovick | |
| 2008/0308091 | A1 | | 12/2008 | Corio | |
| 2009/0143151 | A1 | | 6/2009 | Jung et al. | |
| 2012/0103713 | A1 | * | 5/2012 | Ohashi | F16C 3/03 180/68.4 |
| 2014/0080614 | A1 | | 3/2014 | Nabeshima et al. | |
| 2015/0101443 | A1 | | 4/2015 | Vasicek et al. | |

* cited by examiner

*Primary Examiner* — Daniel P Malley, Jr.
(74) *Attorney, Agent, or Firm* — Shumaker, Loop & Kendrick, LLP; James D. Miller

(57) ABSTRACT

A drive shaft includes an extruded internal tube having teeth formed thereon. The drive shaft also includes an extruded external tube having teeth formed therein and coaxially receiving the internal tube. The teeth of the internal tube engaging the teeth of the external tube, wherein the internal tube and the external tube are aluminum.

10 Claims, 7 Drawing Sheets

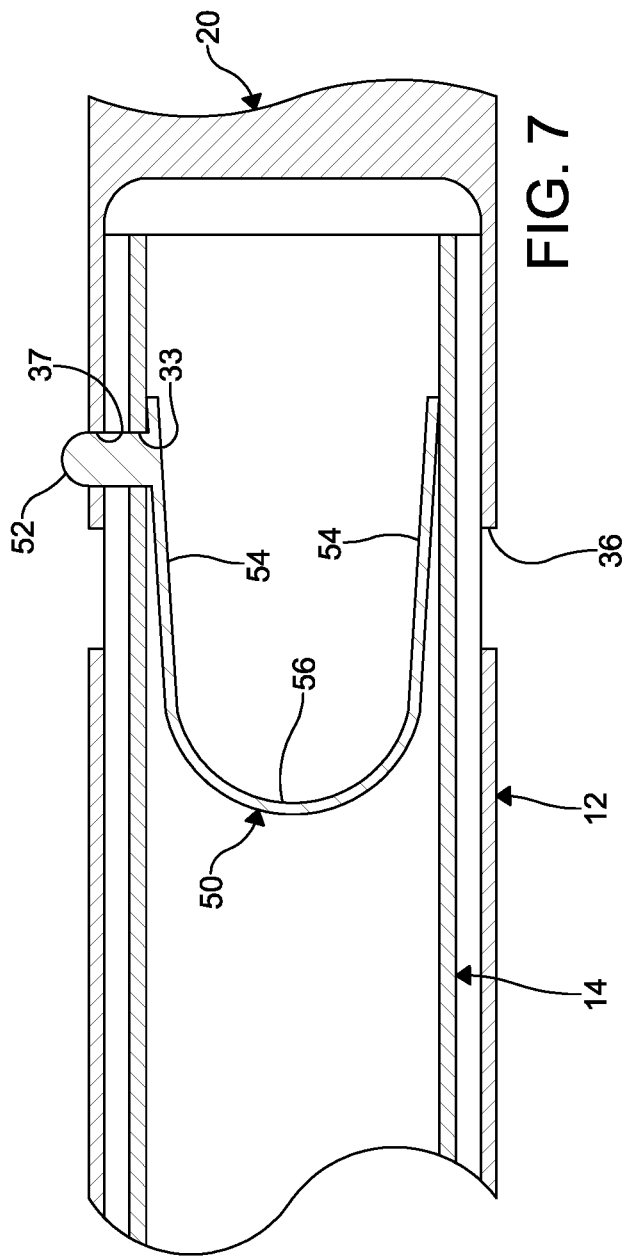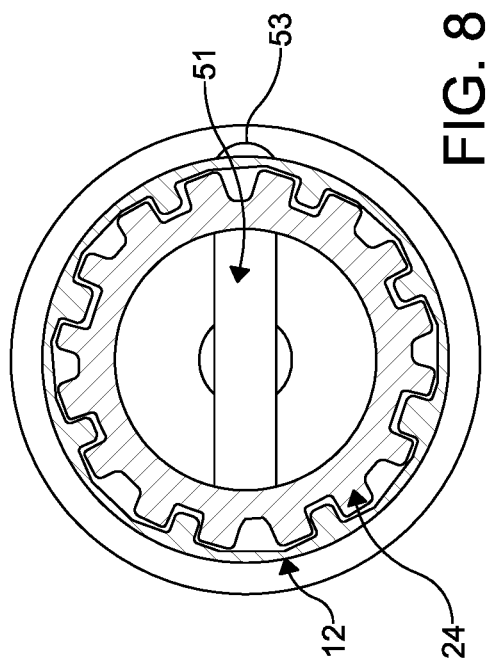

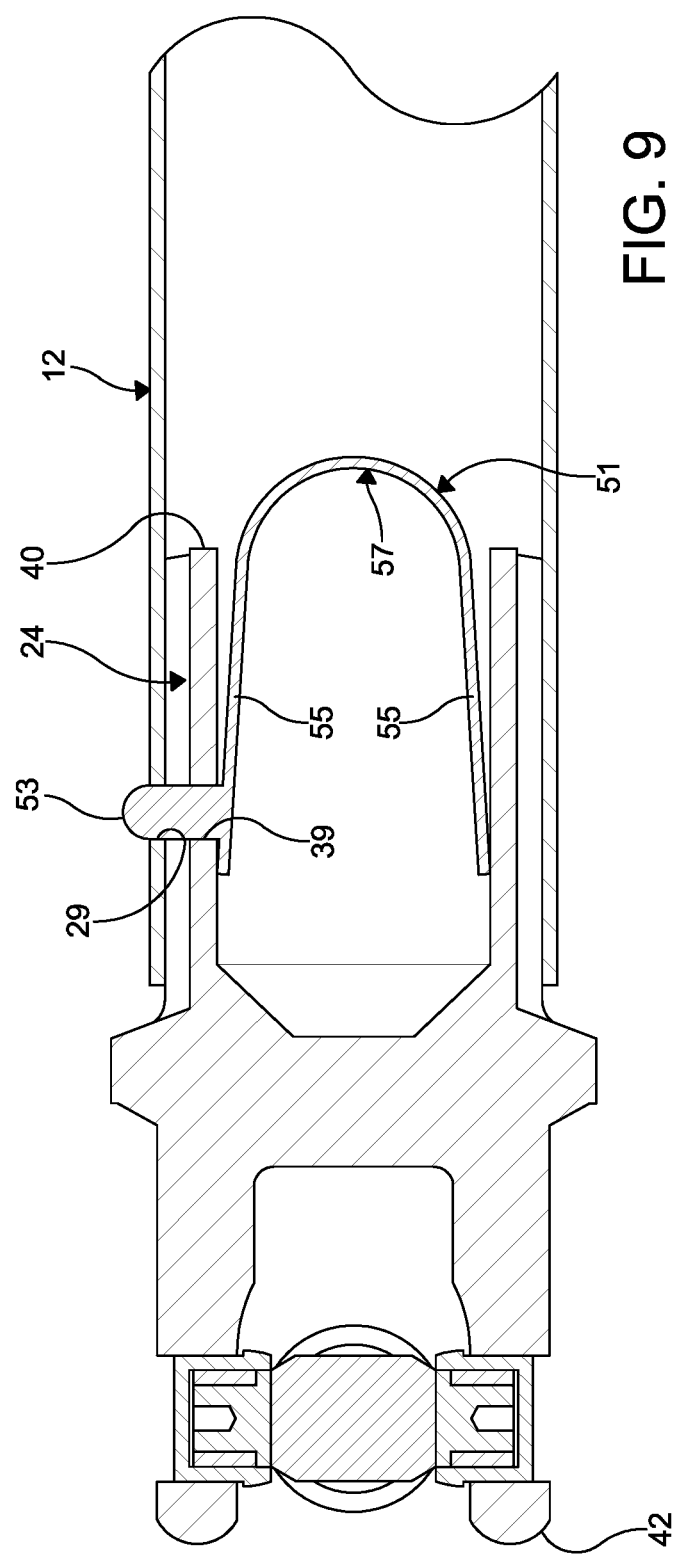

US 10,734,940 B2

SOLAR TRACKER DRIVE SHAFT

CROSS REFERENCE TO RELATED APPLICATIONS

This patent application is a continuation patent application of U.S. patent application Ser. No. 15/717,652, filed on Sep. 27, 2017, which claims the benefit of U.S. Provisional Patent Application Ser. No. 62/400,303, filed on Sep. 27, 2016. The entire disclosures of the above patent applications are hereby incorporated herein by reference in their entirety.

FIELD

The present invention relates to a drive shaft assembly for use in solar tracker assemblies and more particularly to a drive shaft assembly including splined extruded tubes.

BACKGROUND OF THE INVENTION

As commonly known, solar panels such as flat panel photovoltaic systems, for example, are used in renewable energy production. Mechanical tracking systems are employed with the solar panels to cause the solar panels to "track," or concentrate towards, rotate or translate with the motion of the sun relative to the earth to minimize an angle of incidence between the incoming sunlight and the solar panel, thus maximizing the production of solar energy. For example, the panels are caused to move by the tracking systems so the solar panels face the sun as the sun moves from the East in the morning to the West in the evening.

A plurality of solar panels is typically coupled to a plurality of bars forming a plurality of solar panel rows. The bars typically run horizontally (in a North/South direction, for example). The solar panels rotate about the bars to track the sun from East to West. It is understood there are many varying types of mechanical tracking systems employed to rotate solar panels along one axis or more than one axis if desired. An example of a solar tracking system is described and shown in U.S. Pat. No. 8,459,249, the disclosure of which is hereby incorporated by reference in its entirety. A drive mechanism is disposed at one end of the rows.

Drive shafts connect adjacent ones of the solar panels in each of the rows via gearboxes so the solar panels move in unison to substantially track the sun simultaneously. It is desirable for the drive shafts to last a significant number of years such as up to 30 years, for example. Also, depending on the geographical location of the solar panels, the drive shafts need to withstand various types of environments. Typical drive shafts are formed with or a power take off (PTO) tube or a combination of a PTO tube and round tubes. Articulating joints or yoke assemblies are typically used to connect each end of the tube or tubes to the gearboxes. For example, a yoke assembly is used to connect the ends of each of the tubes to the gearboxes. The materials, compositions, and coatings used to form the tubes and the yoke assemblies are costly. For example, tubes can be made of hot dipped galvanized steel and the yoke assemblies may be formed from painted iron castings having properties which meet required torque requirements and endure various environmental conditions, which adds cost.

Additionally, the process of manufacturing the drive shaft tubes is inefficient and costly. The process typically requires components to be welded which increases manufacturing time and cost. Furthermore, due to variations in spacing between the panels in the rows, it is typically desired for the drive shaft to telescope up to 29 inches, for example. However, the galvanization process may cause imperfections within the mating surfaces of the PTO tubes which affects the telescoping. Therefore, it may be required to enlarge an end of the external PTO tube, which increases manufacturing cost and inefficiency.

Furthermore, undesired amounts of lash are present in the PTO tubes due to a variation of coating thicknesses on the tubes. The variation typically results from one end of the tube to the opposing end of the tube and from tube to tube due to large clearances between the parts of the drive line discussed hereinabove. The clearances further result in lash increasing as the coating wears. Since multiple drive shafts are working together (such as 27 for example) in a given row, controllability issues can result from the lash.

Accordingly, it would be desirable to provide a durable drive shaft for solar tracker systems that minimizes cost and complexity of manufacturing and assembly.

SUMMARY OF THE INVENTION

In accordance and attuned with the present invention, a durable drive shaft for solar array systems that minimizes cost and complexity of manufacturing and assembly, has surprisingly been discovered.

According to an embodiment of the disclosure, a drive shaft assembly is disclosed. The drive shaft assembly includes an internal tube having splines formed thereon. An external tube has also splines formed thereon and is coaxially receiving the internal tube. The splines of the internal tube engage the splines of the external tube. Each of the internal tube and the external tube is aluminum.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

The above advantages of the invention will become readily apparent to those skilled in the art from reading the following detailed description of an embodiment of the invention in the light of the accompanying drawings, in which:

FIG. 7 is a fragmentary length-wise cross-sectional view of an internal tube engaging an internal tube articulating assembly of the drive shaft of FIG. 3;

FIG. 8 is a cross-sectional view of the drive shaft of FIG. 3, taken along the line 8-8;

FIG. 9 is a fragmentary length-wise cross-sectional view of an external tube engaging an external tube articulating assembly of the drive shaft of FIG. 3.

DETAILED DESCRIPTION OF THE PREFERRED EMBODIMENT

The following detailed description and appended drawings describe and illustrate various exemplary embodiments of the invention. The description and drawings serve to enable one skilled in the art to make and use the invention, and are not intended to limit the scope of the invention in any manner. As used herein, the terms "substantially" or "about" means "mostly, but not perfectly" or "approximately" as a person skilled in the art would recognize in view of the specification and drawings.

Figure 1:
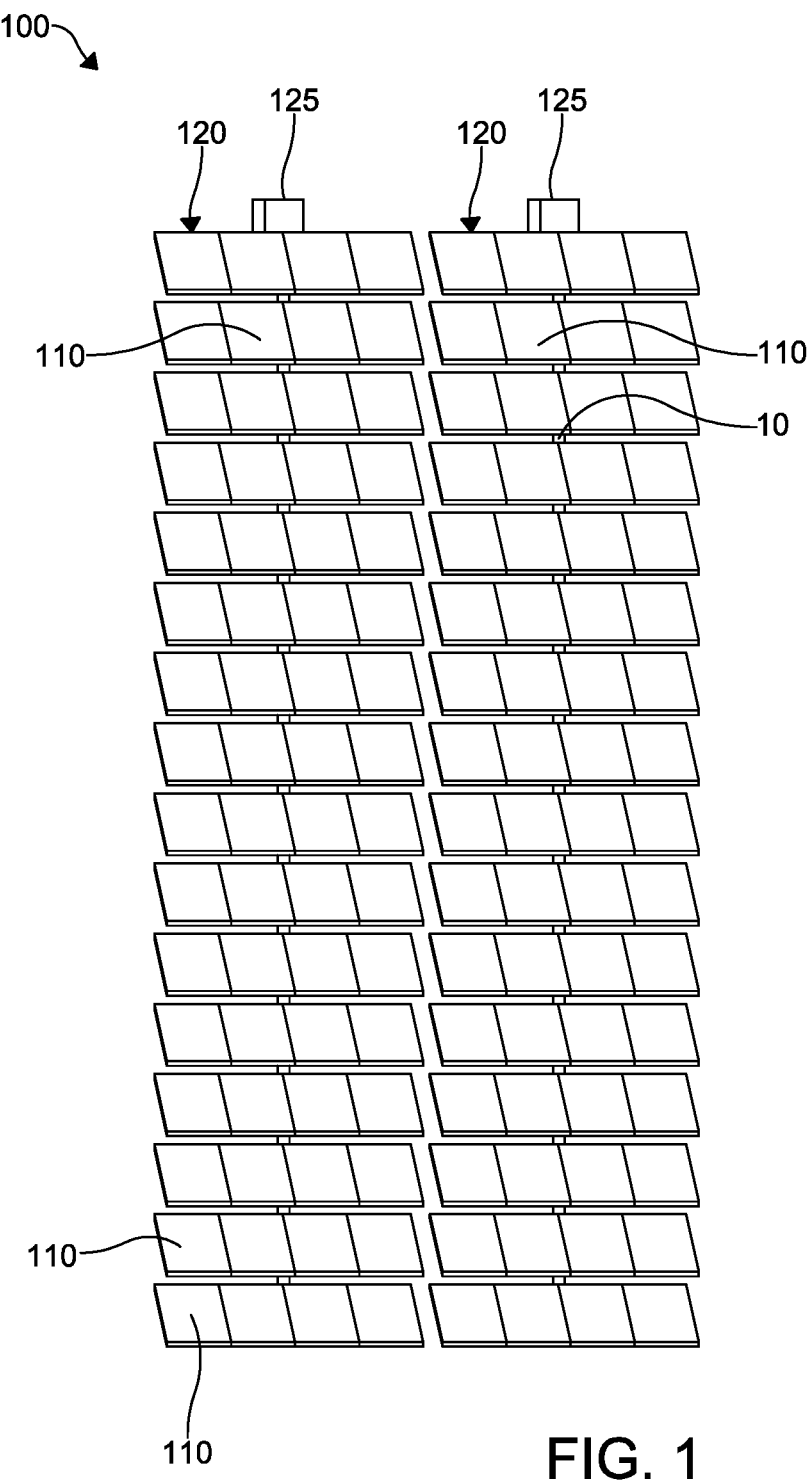
FIG. 1 is a schematic plan view of a pair of rows of panels of a solar panel tracking system in application according to an embodiment of the present disclosure.

FIG. 1 illustrates a solar panel tracking system 100 including a plurality of solar panels 110 positioned and assembled in a plurality of rows 120 on a support surface such as the ground. In the embodiment illustrated, two rows are illustrated. However, it is understood the solar panels 110 can be assembled in greater than or fewer than two rows. The solar panel tracking system 100 can define any numerical area as desired and can define an area up to about 5-10 square miles, for example. Although, the solar panel tracking system 100 can define any numerical area fewer than about 5-10 square miles or more than about 5-10 square miles if desired. The solar panels 110 can be any solar energy collection panel or device such as a photovoltaic module or any other solar collecting devices or solar thermal or materials exposure testing devices.

Figure 2:
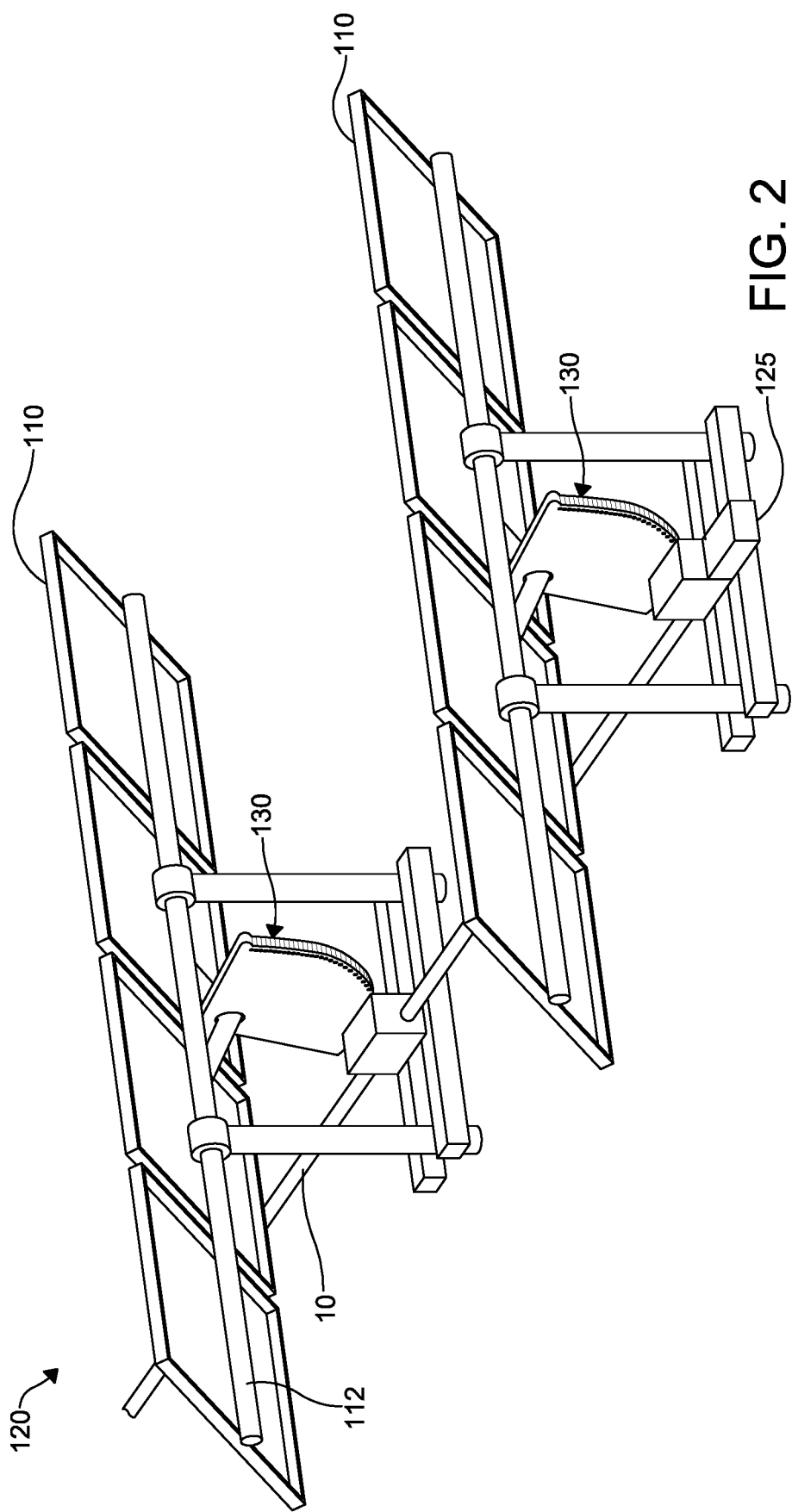
FIG. 2 is a schematic fragmentary perspective view of an end of one of the pairs of rows of the solar panel tracking system of FIG. 1.
Figure 3:
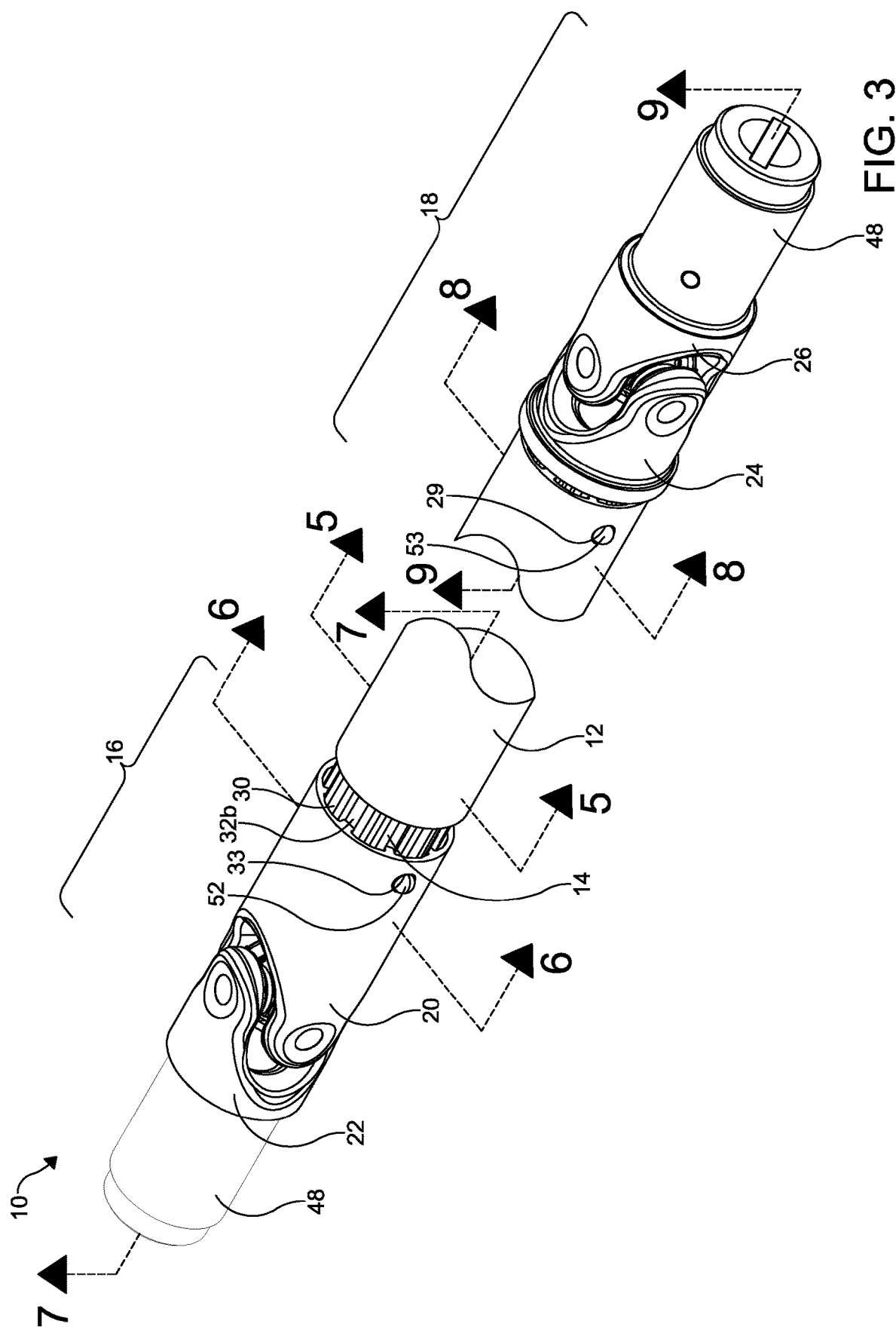
FIG. 3 is a fragmentary perspective view of a drive shaft for the solar panel tracking system of FIGS. 1-2 according to an embodiment of the present disclosure, wherein a portion intermediate opposing ends of the drive shaft is removed for illustrative purposes.
Figure 4:
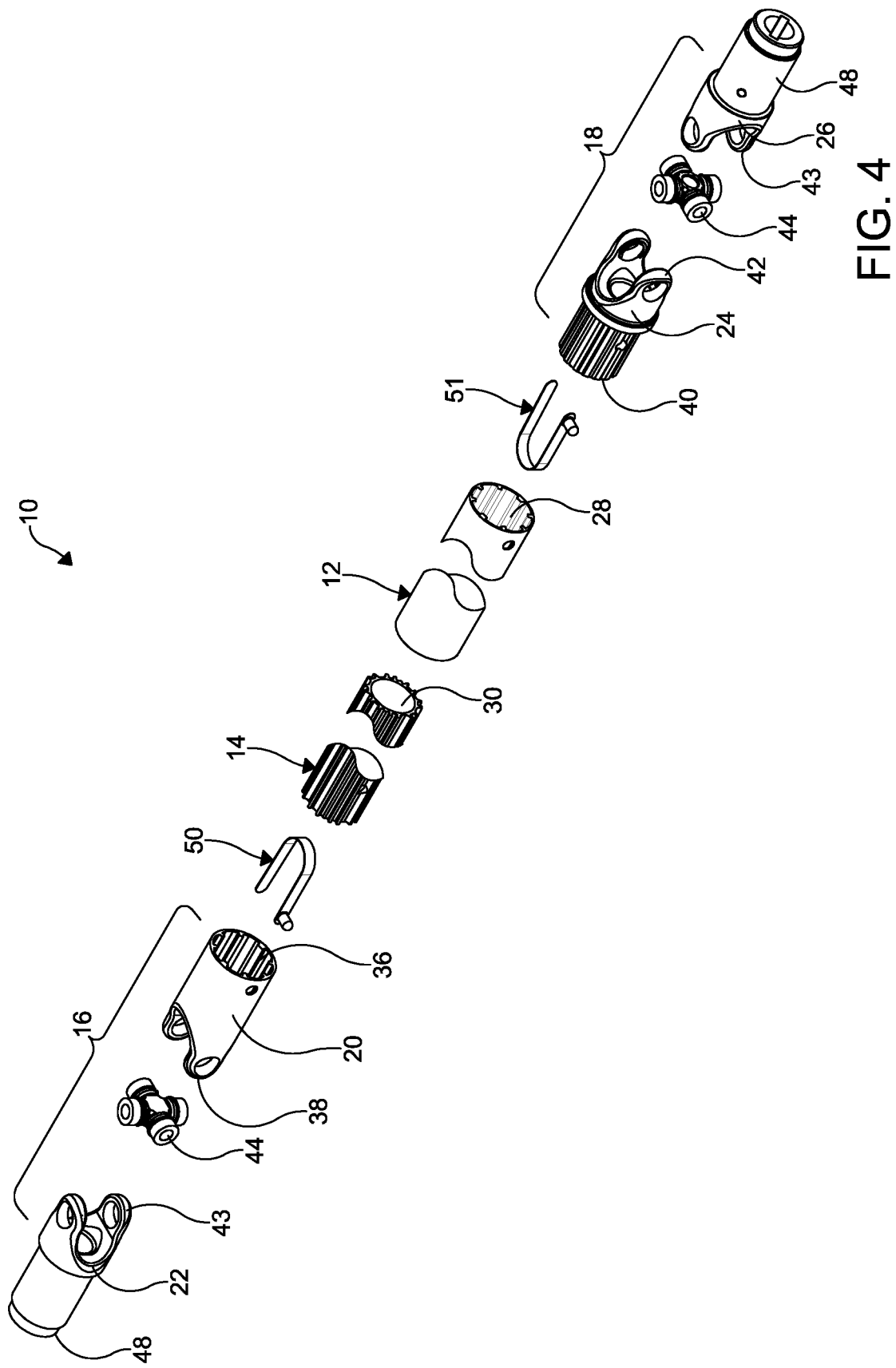
FIG. 4 is a fragmentary exploded perspective view of the drive shaft of FIG. 3, wherein a portion of an outer tube and an inner tube of the drive shaft is removed for illustrative purposes.
Figure 5:
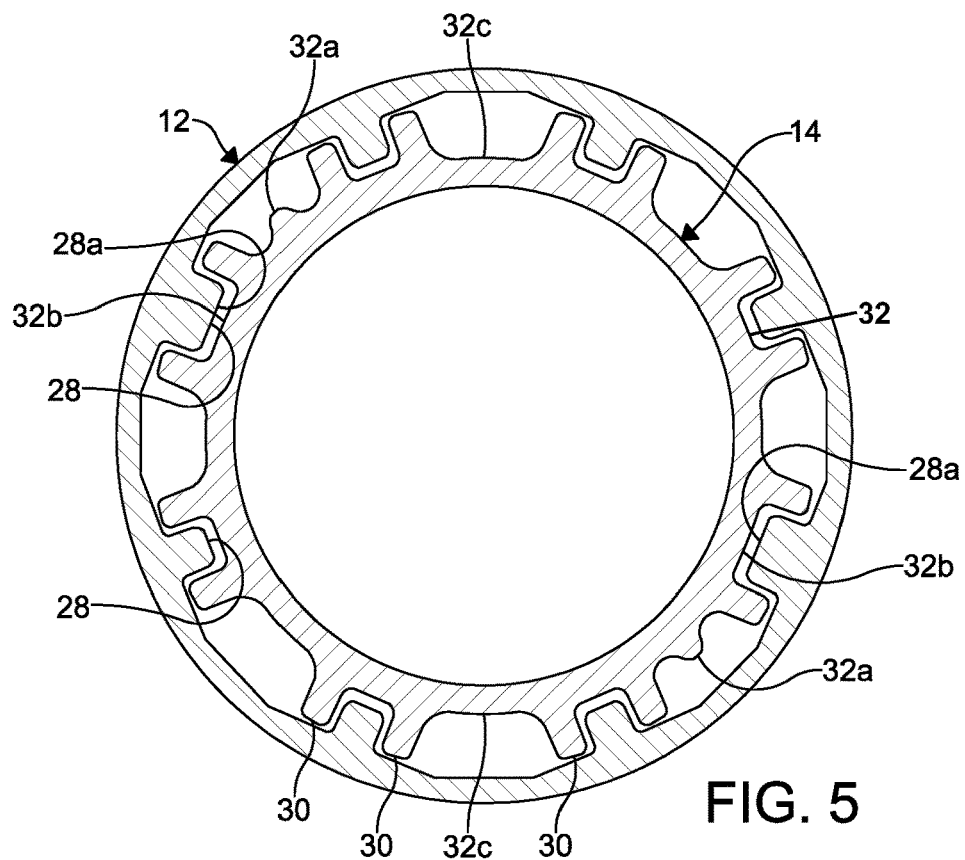
FIG. 5 is a cross-sectional view of the drive shaft of FIG. 3, taken along the line 5-5.
Figure 6:
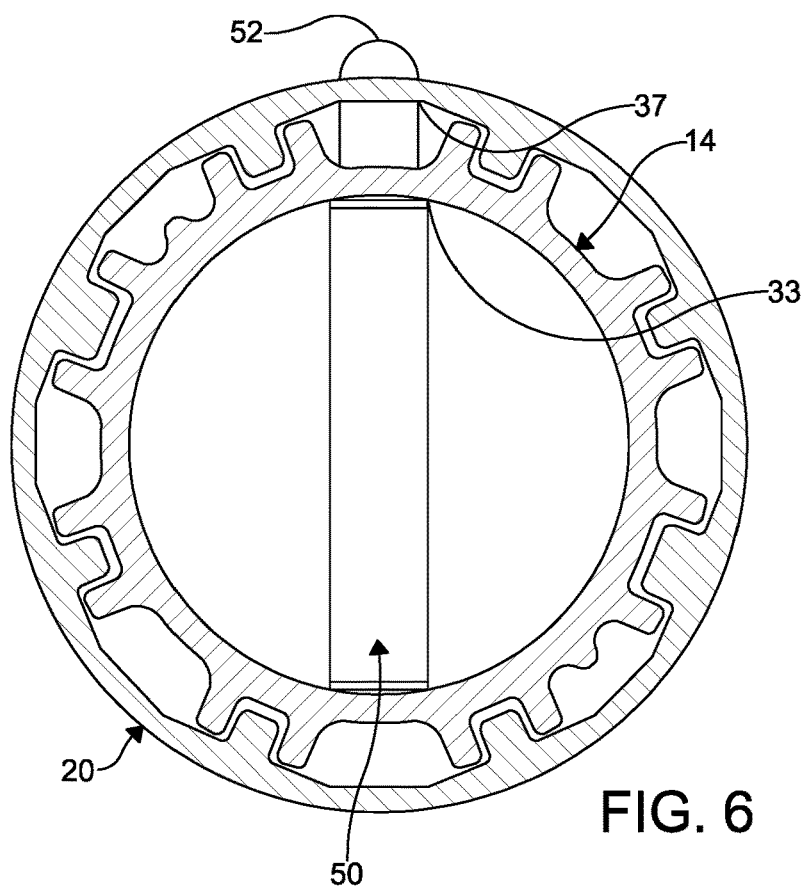
FIG. 6 is a cross-sectional view of the drive shaft of FIG. 3, taken along the line 6-6.

As shown in FIG. 2, the solar panels 110 are coupled to a plurality of bars 112 arranged in parallel to form the rows 120. The solar panels 110 pivot about the bars 112 to track the sun. The term "track" or "tracking" used herein refers to an adaptability of the solar panels 110 to be positioned relative to the sun or the solar absorbing surface of the solar panels 110 being directed towards the sun. When the solar panels 110 are tracking the sun, an angle of incidence with respect to a ray of light from the sun is minimized. An angle of incidence is an angle that a ray of light makes with a line perpendicular to the solar absorbing surface of the solar panels 110.

The solar panels 110 are driven by a drive mechanism 125 located at an end of the rows 120. A drive shaft 10 extends intermediate each of the adjacent ones of the rows 120 and interconnects each of the rows 120 to each other and mechanically connects the rows 120 to the drive mechanism 125. Each of the rows 120 includes a gear assembly 130 which can include a gear box and a gear rack, wherein the gear box mechanically communicates with the gear rack to rotate the solar panels 110 about the bars 112 to track the sun. It is understood other forms of gear assemblies or other assemblies causing the solar panels 110 in each of the rows 120 to mechanically communicate with the drive mechanism 125 can be contemplated. Each of the drive shafts 10 extends between and operably connects each of the gear assemblies 130 of each of the rows 120 to each other. The drive shaft 10 shown in FIG. 2 is schematically illustrated, but will be described in further detail according to embodiments of the invention herein below.

As shown in FIGS. 3-9, each of the drive shafts 10 includes an external tube 12, an internal tube 14, an internal tube articulating assembly 16, and an external tube articulating assembly 18. The internal tube articulating assembly 16 has a tube yoke 20 forming a first part of the internal tube articulating assembly 16 and an end yoke 22 forming a second part of the internal tube articulating assembly 16. The external tube articulating assembly 18 has a tube yoke 24 forming a first part of the external tube articulating assembly 18 and a end yoke 26 forming a second part of the external tube articulating assembly 18.

The external tube 12 has a splined inner surface including a plurality of teeth 28 extending from the inner surface along a length of the external tube 12. Each of the teeth 28 is substantially rectangular shaped. However, it is understood other shapes can be contemplated, if desired. In certain embodiments (FIG. 5), a pair of radially opposing ones 28a of the teeth 28 has a width greater than a width of the other ones of the teeth. An aperture 29 is formed in the external tube 12 proximate a first end thereof. The external tube 12 is aluminum and is formed from an extrusion process.

The external tube 12 typically has a length in a range of about ten to twenty-four feet depending on the distance between adjacent ones of the rows 120 of the solar panels 110. However, other lengths can be contemplated without departing from the scope of the present disclosure. As shown, the external tube 12 typically has a substantially constant diameter from the first end to the second end thereof.

The internal tube 14 has a splined external surface including a plurality of teeth 30 extending from the outer surface along a length thereof and forming a plurality of indentations 32. Each of the indentations 32 is substantially rectangular shaped to correspond to the shape of the teeth 28 of the external tube 12. However, it is understood other shapes can be contemplated, if desired. In certain embodiments, (FIG. 5), a pair of radially opposing ones of the indentations 32 includes a protrusion 32a formed therein extending along a length of the indentations 32. Additionally, a pair of radially opposing ones 32b, 32c of the indentations 32 has a width greater than a width of the other ones of the indentations 32 to accommodate the opposing ones 28a of the teeth 28 of the external tube 12. More than or fewer than two indentations 32 can include the protrusions 32a, if desired. The protrusions 32a facilitate locating proper placement of the internal tube 14 with respect to the external tube 12. An aperture 33 is formed in the internal tube 14 proximate a first end thereof. The internal tube 14 is aluminum and is formed from an extrusion process.

The internal tube 14 typically has a length of about thirty-eight inches. However, other lengths can be contemplated without departing from the scope of the present disclosure. The internal tube 14 typically has a substantially constant diameter from the first end to the second end thereof.

The second end of the external tube 12 receives the second end and a portion of the internal tube 14 therein, wherein the splined internal surface of the external tube 12 interfaces and engages with the splined external surface of the internal tube 14. An interface between the external tube 12 and the internal tube 14 typically has a length in range of about six inches to thirty-five inches. However, other lengths can be contemplated if desired. The teeth 28 of the external tube 12 are received in and engage the indentations 32 of the internal tube 14.

The tube yoke 20 of the internal tube articulating assembly 16 has a first end 36 having a splined inner surface corresponding to the splined outer surface of the internal tube 14. The first end 36 of the tube yoke 20 of the internal tube articulating assembly 16 receives the first end of the internal tube 14. A second end 38 of the tube yoke 20 of the internal tube articulating assembly 16 is configured for coupling to the end yoke 22 of the internal tube articulating assembly 16.

An aperture 37 is formed in the tube yoke 20 of the internal tube articulating assembly 16 to align with the aperture 33 formed proximate the first end of the internal tube 14. The aligning apertures 33, 37 receive a snap portion 52 of a detent 50. As shown, the detent 50 is substantially U-shaped and includes a pair of legs 54 and an arcuate base 56. The detent 50 is received within the internal tube 14. The legs 54 bias away from each other to engage diametrically opposing portions of the inner surface of the internal tube 14. The snap portion 52 extends outwardly from one of the legs 54 and extends through the aperture 33 of the internal tube 14 and through the aperture 37 of the tube yoke 20 to retain the internal tube 14 to the tube yoke 20 of the internal tube articulating assembly 16. It is understood other retaining features such as other detents, pins, fasteners, or screws can be employed to retain the internal tube 14 within the tube yoke 20. The tube yoke 20 of the internal tube articulating assembly 16 is aluminum and may be formed from a cold impact forging process. In application, the snap portion 52 can be pressed inwardly with a force greater than the biasing force of the leg 54 against the inner surface of the internal tube 14 to release the internal tube 14 from the tube yoke 20 of the internal tube articulating assembly 16.

The tube yoke 24 of the external tube articulating assembly 18 has a first end 40 having a splined outer surface corresponding to the splined inner surface of the external tube 12. The first end 40 of the tube yoke 24 of the external tube articulating assembly 18 receives the first end of the external tube 12. A second end 42 of the tube yoke 24 of the external tube articulating assembly 18 is configured for coupling to the end yoke 26 of the external tube articulating assembly 18.

An aperture 39 is formed in the tube yoke 24 of the external tube articulating assembly 18 to align with the aperture 29 formed proximate the first end of the external tube 12. The aligning apertures 29, 39 receive a detent 51, specifically, a snap portion 53 of the detent 50. As shown, the detent 51 is similar to the detent 50 described hereinabove with reference to the internal tube articulating assembly 16. The detent 51 is substantially U-shaped and incudes a pair of legs 55 and an arcuate base 57. The detent 51 is received within the tube yoke 24 of the external tube articulating assembly 18. The legs 55 bias away from each other to engage diametrically opposing portions of the inner surface of the tube yoke 24 of the external tube articulating assembly 18. The snap portion 53 extends outwardly from one of the legs 55 and extends through the aperture 39 of the tube yoke 24 and through the aperture 29 of the external tube 12 to retain the tube yoke 24 to external tube 12. It is understood other retaining features such as other detents, pins, fasteners, or screws can be employed to retain the tube yoke 24 within the external tube 12. The tube yoke 24 of the external tube articulating assembly 18 is aluminum and may be formed from a cold impact forging process. In application, the snap portion 53 can be pressed inwardly with a force greater than the biasing force of the legs 55 against the inner surface of the tube yoke 24 to release the external tube 12 from the tube yoke 24 of the external tube articulating assembly 18.

The end yoke 22 of the internal tube articulating assembly 16 and the end yoke 26 of the external tube articulating assembly 18 each include a first end 43 configured for coupling to the second ends 38, 42 of the tube yokes 20, 24 of the respective tube articulating assemblies 16, 18. A cross pin or fastener 44 can be used to couple the end yokes 22, 26 to the respective tube yokes 20, 24. Other features such as bearings may also be included when coupling the end yokes 22, 26 to the respective tube yokes 20, 24. The end yokes 22, 26 are aluminum and may be formed from a cold impact forging process.

The end yokes 22, 26 each have a keyway formed on an inner surface thereof. The keyway is configured to receive a key of a keyed shaft 48 of the gear assembly 130.

In application, the drive shafts 10 extend between and link adjacent ones of the solar panels 110. Each of the end yokes 22 of the internal tube articulating assemblies 16 is coupled to one of the gear assemblies 130 and each of the end yokes 26 of the external tube articulating assemblies 18 is coupled to an adjacent one of the gear assemblies 130. The drive mechanism 125 causes the gear assembly 130 of a first one of the solar panels 110 in each of the rows 120 at the end of the plurality of rows 120 to operate, thus causing the first ones of the solar panels 110 to pivot. For example, to operate, the drive mechanism 125 includes a shaft coupled to a worm gear or other gear (not shown) in a gear box of the gear assembly 130 of the first one of the solar panels 110 in each of the rows 120. In turn, the gear box of the gear assembly 130 engages a secondary gear which is coupled to the bars 112 of the first one of the solar panels 110 in each of the rows 120. The secondary gear is configured to rotate the first of the solar panels 110 is each of the rows 120 in an east to west direction, for example. Simultaneously, the gear assembly 130 of the first ones of the solar panels 110 at the end of each of the rows 120 transfers torque to the drive shaft 10 causing the drive shaft 10 to rotate. The torque transferred to the drive shaft 10 is then transferred to the gear assembly 130 of the solar panels 110 adjacent the solar panels 110 at the end of each of the rows 120 to pivot simultaneously with the solar panels 110 at the end of the rows 120 substantially equally. For example, the drive shaft 10 is coupled to the gear box of the gear assembly of the solar panels 110 adjacent the solar panels 110 at the end of each of the rows 120 to pivot associated solar panels 110 in the same manner as described hereinabove regarding the solar panels 110 at the end of each of the rows 120. The torque is then transferred successively in a similar manner to each of the remaining ones of the solar panels 110 in each of the rows 120 to cause all of the solar panels 110 in each of the rows 120 to pivot simultaneously substantially equally.

Advantageously, the tubes 12, 14 formed from aluminum and by extrusion process permit an efficient telescoping of the drive shaft 10 to accommodate variations in spacing of the solar panels 110 in each of the rows 120 during installation of the drive shafts 10. The aluminum tubes 12, 14 minimizes weight and thus shipping and handling costs associated with the tubes 12, 14. Additionally, application of a corrosion resistant coating is avoided and lash on the drive shaft 10 is minimized by using the aluminum tubes 12, 14 and the aluminum yokes 20, 22, 24, 26 due to tighter tolerances on the extruded tubes 12, 14. In certain examples, the lash between the tubes 12, 14 can be reduced by up to about 81% from known drive shafts.

Furthermore, the aluminum tubes 12, 14 allow for easier manufacturing by minimizing the parts and the steps required to assemble the drive shaft 10, minimizing a weight of the drive shaft 10, while also minimizing manufacturing costs. In certain examples, the cost of manufacturing the drive shaft 10 of the instant disclosure can be reduced by about 30% compared to known drive shafts. The detents 50, 51 permits ease of assembly, particularly, ease of assembly of the tube yokes 20, 24 with the respective ones of the tubes 12, 14. In prior art, a screw fasteners is used instead of the detents 50, 51 which must be coated with a thread lock to assure the screw fasteners do not become loose over time. This feature makes it difficult to install, remove, and reinstall the components of the prior art drive shafts. According to the invention disclosed herein, the detents 50, 51 permit installing the drive shafts 10 at the job site. In this manner, the components of the drive shafts 10 can be shipped separately to the job site which minimizes costs associated with packaging, handling, and shipping. The articulating assemblies 16, 18 can be coupled to the gearbox shafts without the tubes 12, 14 attached thereto. Such an advantage minimizes a weight of the drive shaft 10 an installer is required to handle, thus resulting in a more ergonomically advantageous installation of the drive shaft 10 and resulting in more precise and efficient alignment and connection to the gearbox shaft. Additionally, reliability in detecting a deficient attachment can be realized. The drive shafts 10 according to the present invention allow the drive shafts 10 to be easily removed and reattached for maintenance purposes such as site maintenance such as grass mowing. For example. The detents 50, 51 assure the internal tube 14 does not get lost inside the external tube 12 during handling and coupling of the tubes 12, 14 to each other. The drive shaft 10 according to the present disclosure also permits one person, rather than more than one person, to install the drive shafts 10 on site.

From the foregoing description, one ordinarily skilled in the art can easily ascertain the essential characteristics of this invention and, without departing from the spirit and scope thereof, can make various changes and modifications to the invention to adapt it to various usages and conditions.

What is claimed is:

1. A drive shaft assembly for a solar panel tracking system comprising:
    an extruded internal tube;
    an extruded external tube coaxially receiving the internal tube;
    a first tube yoke receiving a first end of the internal tube;
    a second tube yoke received in the external tube at a first end of the external tube;
    a first detent coupling the internal tube to the first tube yoke; and
    a second detent coupling the second tube yoke to the external tube, wherein the first detent and the second detent include a base portion and a pair of elongate legs extending from the base portion, and wherein distal ends of the legs of the second detent extend from the base portion of the second detent in an axial direction away from the first end of the internal tube, and wherein each of the first detent and the second detent is substantially U-shaped and includes a snap portion extending outwardly from one of the legs.

2. The drive shaft assembly of claim 1, wherein the internal tube has an aperture formed in the first end thereof, the external tube has an aperture formed in the first end thereof, the first tube yoke has an aperture formed therein, and the second tube yoke has an aperture formed therein.

3. The drive shaft of claim 2, wherein the snap portion of the first detent is configured to be received through the aperture formed in the internal tube and the aperture formed in the first tube yoke and extends outwardly from an outer surface of the first tube yoke, and wherein the snap portion of the second detent is configured to be received through the aperture formed in the second tube yoke and the aperture formed in the external tube and extends outwardly from an outer surface of the external tube.

4. The drive shaft of claim 3, wherein the legs of the first detent bias away from each other to engage diametrically opposing portions of an inner surface of the internal tube.

5. The drive shaft of claim 3, wherein the legs of the second detent bias away from each other to engage diametrically opposing portions of an inner surface of the second tube yoke.

6. The drive shaft of claim 4, wherein an applied force inwardly applied to the snap portion of the first detent releases the internal tube from the first tube yoke, and wherein the applied force is greater than a biasing force of the legs of the first detent.

7. The drive shaft of claim 5, wherein an applied force inwardly applied to the snap portion of the second detent releases the external tube from the second tube yoke, and wherein the applied force is greater than a biasing force of the legs of the second detent.

8. The drive shaft of claim 1, wherein the internal tube has an annular array of teeth formed on an outer surface thereof and the external tube has an annular array of teeth formed on an inner surface thereof, the teeth of the internal tube engaging the teeth of the external tube to militate against rotation of the internal tube with respect to the external tube.

9. A drive shaft assembly for a solar panel tracking system comprising:
    an extruded tube having an aperture formed therethrough; and
    a detent configured for engaging the tube to a portion of the drive shaft assembly, wherein the detent is substantially U-shaped and includes a pair of legs and an arcuate base between the legs, wherein the detent includes a snap portion extending outwardly from one of the legs, and wherein the snap portion is configured to extend through the aperture of the tube to engage the tube to the portion of the drive shaft assembly, wherein a distal end of each of the pair of legs is rectilinear and engages one of an inner surface of the tube and an inner surface of the portion of the drive shaft assembly, wherein the tube is an internal tube and a portion of the drive shaft is a tube yoke receiving the internal tube or the tube is an external tube and the portion of the drive shaft is a tube yoke received in the external tube, and wherein the tube yoke has an aperture formed therein aligning with the aperture of the tube, the snap portion extending through the aperture of the tube yoke.

10. The drive shaft assembly of claim 9, wherein the legs bias away from each other to engage diametrically opposing portions of one of the tube and the portion of the drive shaft assembly.

* * * * *